United States Patent Office 3,498,926
Patented Mar. 3, 1970

3,498,926
DICHROMATE VAPOR PHASE
CORROSION INHIBITOR
Wilburn A. Boggs, Smyrna, Ga., assignor to Lockheed
Aircraft Corporation, Burbank, Calif.
No Drawing. Continuation of application Ser. No.
455,959, May 14, 1965. This application Aug. 19,
1968, Ser. No. 755,501
Int. Cl. C23f 11/00; C09k 3/00
U.S. Cl. 252—387                                    4 Claims

ABSTRACT OF THE DISCLOSURE

A solution for inhibiting corrosion and for neutralizing alkaline corrosion by-products, especially as occurring in structural joints or other relatively confined regions. Corrosion inhibiting characteristics are obtained with a mixture of metallic chromate, a vapor phase inhibitor, and a surface active agent to adjust the surface tension of the solution for the desired penetration into the region being treated. An excess of acid chromate ions is supplied to the solution to neutralize alkaline corrosion by-products and to neutralize alkaline substances produced by the inhibiting action of the metallic chromate.

---

This is a continuation of application Ser. No. 455,959, filed May 14, 1965, now abandoned.

This invention relates in general to corrosion control and in particular to a solution for inhibiting corrosion in cracks, crevices, and similar locations where ordinary corrosion control techniques are not feasible without disassembly of the structure.

An exemplary use to which the solution of this invention may be put is as a corrosion inhibiting solution in the practice of copending application Ser. No. 455,759, entitled "Method for Treatment of Corrosion," filed May 14, 1965 and issued as U.S. Patent No. 3,351,421, assigned to the same assignee as the present invention.

The occurrence of corrosion in metallic structural members is well known, and those skilled in the art need no introduction to the undesirable effects of such corrosion. Problems involving corrosion become particularly acute where the corroded member or members are so situated as to be relatively inaccessible so that it is difficult, expensive, or impossible to remove the corrosion products and treat the affected surfaces to inhibit or prevent further corrosion.

An example of such a situation is found in the faying surfaces as existing, for example, in modern aircraft. Faying surfaces are those mating surfaces defined when a surface of a first structural member, such as an aircraft wing panel, is brought into contact with a surface of another structural member, such as the structural member supporting the wing panel. The respective areas where these two adjacent surfaces abut and are in intimate contact are known as faying surfaces. Inasmuch as the structural members usually are secured together as by riveting or other suitable techniques, the clearance between the faying surfaces is usually quite small. Typically, two or more wing panels are attached to a support member to provide a plurality of faying surfaces with a joint or seam defined by the abutting edges of the panels located therebetween.

It has been learn that corrosion-producing substances such as water, salt water, or the like may be conducted into and entrapped within the faying surfaces by means of capillary action or other movement in the absence of a suitable seal on this joint or if such a seal becomes ineffective. These entrapped substances cause corrosion to commence in the faying surfaces and it is apparent that this corrosion will continue due to the substances entrapped in the faying surfaces. In a similar manner there can occur induction of corrosion-producing substances into naturally occurring locations such as cracks, crevices or the like.

Heretofore, the only manner of dealing with such corrosion has involved the disassembly of the structural members defining the faying surfaces, the removal by mechanical and/or chemical techniques of the corrosion product, the treating of the affected metal surfaces with chemical conversion or paint type coatings or the like to inhibit further corrosion of these surfaces, and the reassembly of the structural members to reform the faying surfaces. The disadvantages of such a technique are obvious; and it is apparent that in the example of a major assembly such as an aircraft wing whose members are assembled by means of semi-permanent fastening techniques such as riveting, the practice of this technique results in an unconscionable amount of time and expense. The direct cost of performing these operations is multiplied by the cost involved in having the aircraft inoperable for an extended period of time.

Of course, corrosion products can form in a similar manner in any space or aperture wherein corrosion-producing substances may be introduced. In the case of corrosion forming in a crack or crevice in the surface of a metal, it is apparent that there is no practical way that the metal part can be disassembled for removal of this corrosion; therefore, if the presence of corrosion products and continuing corrosion cannot be tolerated in such a circumstance, the only alternative is complete replacement of the affected part.

These problems heretofore associated with corrosion and corrosion products are alleviated according to the present invention wherein there is provided a solution which may be applied to faying surfaces or other surfaces defining a relatively small intersurface spacing and which functions not only to inhibit further corrosion on such surfaces but which also functions to neutralize existing corrosion products. The solution of this invention also provides corrosion inhibition in faying surfaces and the like, even though such surfaces may include local discontinuities not wetted by the solution.

Accordingly, an object of this invention is to provide an improved corrosion inhibiting solution.

Another object of this invention is to provide a corrosion inhibiting solution which is easily applicable to locations that are physically inaccessible.

A further object of this invention is to provide a corrosion inhibiting solution applicable to faying surfaces without requiring disasembly of the structural members defining these surfaces.

Still another object of this invention is to provide a corrosion inhibiting solution which is applicable to closely spaced apart surfaces.

Yet another object of this invention is to provide a corrosion inhibiting solution intended for use in closely spaced apart surfaces wherein the effectiveness of the soluton is not impaired by the presence in such surfaces of portions having spacing excessively great for effective wetting by the solution.

A still further object of this invention is to provide a corrosion inhibiting solution which tends to neutralize existing corrosion products.

Still another object of this invention is to provide a corrosion inhibiting solution which tends to neutralize alkaline products resulting from the inhibiting action of the solution.

A further object of this invention is to provide a corrosion inhibiting solution which tends to convert alkaline products resulting from the inhibiting action of the solution into a composition capable of effecting further corrosion inhibiting action.

The exact nature of this invention as well as other objects and advantages thereof will be readily apparent from consideration of the following specification.

Stated generally, the embodiment of this invention described below comprises an aqueous solution including hexavalent metalic chromium ions along with a vapor phase inhibitor to inhibit corrosion in the faying surfaces of such metals as, for example, aluminum. In addition to the metallic chromate used to inhibit corrosion, the solution contains a quantity of acid chromate ions which function to neutralize both the existing alkaline corrosion products and any metallic hydroxides that are formed by the corrosion inhibiting reaction. A suitable surface active agent is added to the solution to adjust, usually by lowering, its surface tension so that the wettability of the solution accomplishes substantially complete coverage of the faying surface. The acid chromate ions are furnished in the form of either a metallic acid chromate or metallic chromates plus chromic acid.

Stated more specifically, the embodiment of this invention described herein provides a solution which when applied to a faying surface results in a reaction of metallic chromate ions [$MCrO_4$, where M represents a metal] which tend to form a corrosion inhibiting film on the metal. The exact mechanism of this inhibiting action is not known with absolute certainty. By way of example, however, it is believed in the case of aluminum that the grain boundaries of the metallic grains are anodic with respect to the grains and that it is these anodic areas which actually corrode. However, it is believed that introduction of chromate ions causes these ions to be attracted to the anodic grain boundaries and to form a protective coating thereover.

Hexavalent chromium ions generally are preferred for the purpose of inhibiting corrosion; however, the addition into a faying surface or other metallic surface undergoing corrosion treatment of a metallic chromate, such as sodium chromate [$Na_2CrO_4$], while causing the production of the desired chromate ions under galvanic dissociation, also produces sodium hydroxide [$NaOH$], an alkali of sufficient strength to cause corrosion of aluminum. This obviously is undesirable in a solution intended for use as a corrosion inhibitor.

This problem of secondary corrosion-producing byproducts is alleviated to some extent by the use of a metallic chromate selected from the second periodic group (of the Periodic Table as contained, for example, in the "Handbook of Chemistry and Physics, Thirtieth Edition," dated 1947 and published by the Chemical Rubber Publishing Company), for example, magnesium chromate [$MgCrO_4$]. Dissociation of magnesium chromate produces magnesium hydroxide [$Mg(OH)_2$] which, while also being alkaline, is less corrosive to aluminum than is sodium hydroxide. Nonetheless, the problem of a corrosive secondary byproduct remains.

This problem is alleviated or overcome by supplying an excess of acid chromate ions to the solution in the form either of metallic acid chromates or of metallic chromates plus chromic acid. An example of the metallic acid chromates is given by $MCr_2O_7 \cdot XH_2O$ where M is a metal and X is the appropriate quantity of water. An example of a metallic chromate and chromic acid is represented by $MCrO_4 \cdot XH_2O + H_2CrO_4$ [$CrO_3$+water], where M is a metal and X is a suitable quantity of water. This presence in the solution of available chromic acid or acid chromate salts provides a reserve of acid chromate ions which functions to neutralize the corrosion products, if any, located where the solution is applied and also functions to neutralize the alkaline product generated by the reduction of the metallic chromate. The metal represented by M above may be any monovalent or divalent metal, although the divalent metals such as magnesium, calcium, zinc, strontium, cadmium and barium, are preferred because of the relative mildness of the alkaline product generated by these metals upon depletion of chromate ions. In some circumstances, magnesium may be preferred as the metal because of the relatively great solubility in water of magnesium chromate.

An additional corrosion-inhibiting component in this solution is a suitable vapor phase inhibitor such as cyclohexylcarbamic acid, cyclohexylamine carbonate, certain nitrites, or diphenylamine. The exact composition of this vapor phase inhibitor is unimportant so long as the vapor phase inhibitor has a vapor exhibiting corrosion-resistant properties such that this vapor, when occurring in a relatively confined region and in proximity to the faying surfaces or other area undergoing treatment, tends to inhibit corrosion thereof.

Since the corrosion-inhibiting solution of this invention is intended to be introduced into faying surfaces or other areas generally having very little space between the faces thereof, it usually is necessary to add to the solution a suitable surface active agent to reduce the surface tension of the solution to a level whereat the wettability of the solution is effective to promote relatively rapid penetration and spreading of the solution throughout substantially all of the area of interest. An example of a suitable surface active agent for this purpose has been found to be a fluorocarbon wetting agent.

As an example of a corrosion-inhibiting solution produced according to this invention, the following subcombination solutions were combined:

|  | Grams |
|---|---|
| $MgCrO_4 \cdot 7H_2O$ in 50 ml. of water | 30 |
| $CrO_3$ in 25 ml. of water | 11.3 |
| Cyclohexylcarbamic acid in 10 ml. of water | 1 |

Mix all subcombination solutions and make up to 100 ml. total. Next, dissolve 0.14 gram of FC–128 fluorocarbon wetting agent in 10 ml. of isopropyl alcohol and add this solution of wetting agent to the combined solutions slowly while stirring. All ingredients must be thoroughly mixed before the solution is applied to an area undergoing treatment.

The purpose and operation of the excess chromic acid will now be considered. When the magnesium chromate undergoes galvanic dissociation, there is formed magnesium hydroxide [$Mg(OH)_2$], an alkali which is corrosive of aluminum. However, the following chemical reaction takes place:

$$Mg(OH)_2 + CrO_3 + H_2O \rightarrow MgCrO_4 + 2H_2O$$

From the above, it is seen that the magnesium hydroxide has been neutralized by the presence of excess chromic acid and that there has been produced additional magnesium chromate which now is available to perform further corrosion inhibiting.

An additional function of the excess chromic acid exists in the conversion of existing corrosion products. These corrosion products, which in the case of aluminum may be oxides of aluminum and other metals, have combined with water to form metallic hydroxides such as aluminum hydroxide [$Al(OH)_3$]. The aluminum hydroxide, however, reacts with chromic acid according to the following reaction:

$$2Al(OH)_3 + 3CrO_3 + H_2O \rightarrow Al_2(CrO_4)_3 + 4H_2O$$

From the foregoing it is seen that the aluminum hydroxide has been eliminated and that there has been produced in its place aluminum chromate, which also may serve as a corrosion inhibitor.

The exact mechanism of operation of the vapor phase inhibitor is not known, but it is believed that the vapor of this inhibitor forms an adsorbed film on the surfaces undergoing treatment and that this film prevents these surfaces from being contacted and affected by corrosion-producing substances. In the application of this solution to faying surfaces or other regions, the faying surfaces or regions undergoing treatment may contain local irregularities causing portions of the opposed surfaces making up the faying surface or region to be separated to such an extent that introduction of the solution to these areas nonetheless does not cause sufficient wetting of these portions to enable effective application thereto of metallic chromate. In such an instance, the presence of the vapor phase inhibitor nonetheless is effective to provide protection to the metal in these portions.

In the foregoing discussion and examples, where specific reference was made to magnesium chromate or magnesium dichromate, it should be understood that this is merely exemplary and that any appropriate metallic chromate may be used in the practice of this invention. As mentioned earlier, certain of the chromates may be desirable in specific applications because of the metal undergoing treatment or because of the extent of corrosion therein. It also should be noted that this solution is not limited to a chromate and a dichromate of the same metal but that this portion of the solution may comprise, for example:

$$MCrO_4 + X.M'Cr_2O_7$$

where M is a first metal, M' is a second metal, and X represents the appropriate quantity of metallic dichromate. The important factor is the presence of sufficient chromic acid or acid chromate salts apart from the metallic chromate used for corrosion inhibiting purposes, to provide the function of neutralizing alkaline substances present or produced by the inhibiting process.

What is claimed is:

1. An aqueous solution for inhibiting the formation of corrosion in a region formed by confrontingly adjacent closely spaced apart surfaces accessible to treatment only through a fluid passageway and for neutralizing corrosion products existing in the region, consisting essentially of:
    a water soluble metallic chromate having the property of inhibiting corrosion of a selected metal;
    an ingredient selected from the group consisting of (M') $Cr_2O_7$ and (M'')$CrO_4+CrO_3$, where (M') and (M'') are metals selected from the group consisting of calcium, magnesium, and sodium,
        said ingredient providing a quantity of excess acid chromate ions for neutralizing reaction with metallic hydroxides occurring in the region undergoing treatment for corrosion; and
    a vapor phase inhibitor having a vapor which inhibits corrosion of the surfaces forming the closely spaced apart region.

2. A solution as in claim 1, wherein (M') and (M'') are selected from the group consisting of magnesium and calcium.

3. An aqueous solution for inhibiting the formation of corrosion in a region formed by confrontingly adjacent closely spaced apart surfaces accessible to treatment only through a fluid passageway and for neutralizing corrosion products existing in the region, consisting essentially of:
    an aqueous solution of (M)$CrO_4$, where (M) is a metal selected from the group consisting of calcium, magnesium, and sodium;
    an excess quantity of water soluble acid chromate ions for reactively neutralizing reaction with metallic hydroxides occurring in the region undergoing treatment for corrosion; and a vapor phase inhibitor having a vapor which inhibits corrosion of the surfaces forming the closely spaced apart region.

4. A solution as in claim 3, wherein (M') and (M'') are selected from the group consisting of magnesium and calcium.

References Cited

UNITED STATES PATENTS

| 2,592,451 | 4/1952 | Moore et al. |
| 2,629,649 | 2/1953 | Wachter et al. |
| 2,630,368 | 3/1953 | Wachter et al. |
| 2,891,881 | 6/1959 | Jaffe. |
| 2,978,293 | 4/1961 | Cerveny. |

FOREIGN PATENTS 648,790    9/1962    Canada.

OTHER REFERENCES

Speller, Corrosion, Causes and Prevention, McGraw-Hill, 1951, Chapter 8, p. 397.

Evans, V.R., St. Martin's Press, 1960, pp. 151–157, and pp. 531–532, TA 462 E8.

MAYER WEINBLATT, Primary Examiner

I. GLUCK, Assistant Examiner

U.S. Cl. X.R.

21—2.5; 252—146, 148, 390, 394